US010700948B2

(12) United States Patent
Bai

(10) Patent No.: US 10,700,948 B2
(45) Date of Patent: Jun. 30, 2020

(54) SERVICE-ORIENTED MODULAR SYSTEM ARCHITECTURE

(71) Applicant: Yang Bai, Shanghai (CN)

(72) Inventor: Yang Bai, Shanghai (CN)

( * ) Notice: Subject to any disclaimer, the term of this patent is extended or adjusted under 35 U.S.C. 154(b) by 90 days.

(21) Appl. No.: 15/778,582

(22) PCT Filed: Aug. 8, 2016

(86) PCT No.: PCT/CN2016/093881
§ 371 (c)(1),
(2) Date: May 23, 2018

(87) PCT Pub. No.: WO2016/169530
PCT Pub. Date: Oct. 27, 2016

(65) Prior Publication Data
US 2018/0359161 A1 Dec. 13, 2018

(30) Foreign Application Priority Data

Jun. 22, 2016 (CN) .......................... 2016 1 0454982

(51) Int. Cl.
G06F 15/177 (2006.01)
H04L 12/24 (2006.01)
G06F 9/445 (2018.01)

(52) U.S. Cl.
CPC ...... H04L 41/5048 (2013.01); G06F 9/44526 (2013.01); H04L 41/0806 (2013.01)

(58) Field of Classification Search
CPC ............. H04L 41/5048; H04L 41/5051; H04L 41/5054; H04L 9/32; G06F 9/18; G06F 9/44; G06F 9/44526
See application file for complete search history.

(56) References Cited

U.S. PATENT DOCUMENTS 7,562,369 B1 * 7/2009 Salamone ................. G06F 9/54
719/328
7,657,762 B2 * 2/2010 Orr ........................ G06F 1/3203
713/300

(Continued)

FOREIGN PATENT DOCUMENTS

CN 102073520 A 5/2011
CN 102624919 A 8/2012

(Continued)

Primary Examiner — Yves Dalencourt
(74) Attorney, Agent, or Firm — Muncy, Geissler, Olds & Lowe, P.C.

(57) ABSTRACT

A service-oriented modular system architecture. The service-oriented modular system architecture has plugins and an application programming interface (API) Nexus. The plugins abstract different functions in servers into pluggable business modules. Any numbers of API dispatchers can be registered on the API Nexus so that one business module in the plugins dynamically exposes the services, which can be provided at present, to other business modules in the plugins in a manner of API. Different functions in the server application are independently abstracted into different pluggable business modules, the separating effect of respectively encapsulating and separating different functions to obtain subservices is achieved, and different business modules are allowed to expose interfaces with each other for use.

5 Claims, 3 Drawing Sheets

(56) References Cited

U.S. PATENT DOCUMENTS

| | | | |
|---|---|---|---|
| 7,752,637 B2 * | 7/2010 | Gunduc | G06F 9/54 |
| | | | 719/330 |
| 2015/0095469 A1 | 4/2015 | Kim et al. | |
| 2019/0236825 A1 * | 8/2019 | Straub | G06F 9/451 |

FOREIGN PATENT DOCUMENTS

| | | |
|---|---|---|
| CN | 103309674 A | 9/2013 |
| CN | 104239143 A | 12/2014 |
| CN | 104991760 A | 10/2015 |

\* cited by examiner

SERVICE-ORIENTED MODULAR SYSTEM ARCHITECTURE

BACKGROUND OF THE INVENTION

1. Field of the Invention

The present invention relates to the field of distributed server cluster systems, in particular to a service-oriented modular system architecture.

2. The Prior Arts

Since long ago, the high-layer architecture at server end has been categorized into two contradictory patterns: SOA (Service-oriented architecture) and AIO (All in one). SOA divides a complete application into several independent services, each of which provides a single function (such as session management, trade evaluation, and user points). These services expose their interfaces and communicate with each other through IPC mechanisms like RPC and WebAPI, altogether composing a complete application.

Conversely, AIO restricts an application within a separate unit. Different services within SOA behave as different components and modules. All components usually run within a single address space (the same process), and the codes of all components are usually maintained under the same project altogether.

The advantage of AIO is simplified deployment, eliminating the need for deploying multiple services and implementing high availability clustering for each service. AIO architecture has far higher efficiency than SOA, because it can avoid huge consumptions caused by IPC communications like network transmission and memory copy.

On the other hand, components within AIO are highly inter-dependent with poor reusability and replaceability, making maintenance and extension difficult. It is common that a rookie will spend a lot of effort and make many mistakes before getting the hang of a huge project which contains a large number of highly coupled components and modules. Even a veteran is prone to cause seemingly irrelevant functions being affected after modifying functions of a module, because of complicated inter-dependence among components.

The SOA architecture features complex deployment and configuration. In real cases, a large application is usually divided into hundreds of independent services. For example, a famous e-commerce website (among the top 5 in China) which fully embraces SOA has divided their Web application into tens of hundreds of services. We can imagine the huge amount of workload required to deploy hundreds of servers within high availability environment where multiple active data centers exist, and to configure these servers to establish coordination relationships among them. For example, the recent network outage with ctrip.com was followed by slow recovery due to its huge SOA architecture which comprises tens of hundreds of services.

Inefficient is another major disadvantage of SOA. From the logic flow perspective, almost every complete request from the client needs to flow through multiple services before the final result is generated and then returned to the client. Flowing through each service (through messaging middleware) is accompanied by multiple times of network and disk I/O operations. Thus several requests will cause long network delay accumulatively, resulting in bad user experience and high consumption of resources.

FIG. 3 shows the conventional messy SOA dependencies (Image from the Internet).

The responsibility to implement the support for cross-service distributed transaction will fall on the application developers, no matter each service is connected to a different DBMS or all services are connected to the same distributed DBMS system. The effort for implementing distributed transaction itself is more complex than most of common applications. Things will become more difficult when we try to add high availability and high reliability assurance to it, to achieve this goal, developers need to: utilize algorithms like Paxos/Raft or master/slave+arbiter for a single data shard; and employ algorithms like 2PC/3PC for transactions comprised of multiple data shards to achieve the ACID guarantee. Therefore, a compromise solution for implementing cross-service transactions within SOA applications is to guarantee the eventual consistency. This also requires extensive efforts, because it is not easy to implement consistency algorithms in a complex system.

Most of SOA systems usually need to utilize messaging middleware to implement message dispatching. This middleware can easily become a bottleneck if there are requirements for availability (part of nodes failed will not affect normal operation of the system), reliability (ensures messages are in order and never repeated/lost even when part of nodes failed), functionality (e.g., publish-subscribe pattern, distributing the tasks in a round-robin fashion) etc.

SUMMARY OF THE INVENTION

In order to solve the problem, the present invention provides a service-oriented modular system architecture (μSOA), services running independently are replaced by cross-platform plugins (IPlugin) that support hot-plugging and hot-unplugging. A plugin dynamically exposes (register) and hides (unregister) its function interfaces through (and only through) API Nexus, and consumes services provided by other plugins also through API Nexus.

In order to realize the purpose, the service-oriented modular system architecture is characterized by comprising plugins and API Nexus, wherein the plugins abstract different functions in servers into pluggable business modules (BMOD, generally, each business module corresponds to one plugin), and any number of application programming interface dispatchers (API Dispatchers) can be registered on the API Nexus, so that one business module in the plugin dynamically exposes the services, which can be provided at present, to the system and other business modules or other plugins belonging to the system in a manner of API.

Further, the dynamic API registering or unregistering mechanism is matched with the hot-plugging and hot-unplugging capability of the plugin interface.

Further, each plugin can carry any complex configuration information, the information is divided into several parts, such as general configurations, advanced configurations and internal configurations. Each part can be customized according to the category of the plugins or the specific implementations thereof.

Further, each plugin can carry two virtual file systems (VFS) containing any types of resources, namely a resource virtual volume for external services, and private virtual volume for internal services.

Further, the API nexus comprises a dispatcher registering unit, a dispatcher unregistering unit, an API call request making unit, an API call request posting unit and an API dispatcher matching unit.

The present invention fully inherits the high cohesion and low coupling characteristics of SOA architecture. Each plugin behaves like an independent service, has clear interface and boundary, and can be easily reused or replaced. It is comparable to SOA from the maintenance perspective. Each plugin can be developed and maintained separately, and a developer only needs to take care of his own plugin. By the addition of new plugins and recombination of existing plugins, this invention makes things easier to modify or extend existing functions than SOA architecture.

The present invention is comparable to AIO with regard to performance and efficiency. All plugins run within the same process, thus calling another plugin through API Nexus does not need any I/O or memory copy or any other forms IPC consumption.

The deployment of μSOA is as simple as AIO. It can be deployed to a single node, and can achieve high availability and horizontal scaling by deploying only a single cluster. The configuration of μSOA is far simpler than SOA. Compared with AIO, configuring a list of modules to be loaded is the only thing added for μSOA. However, all the configurations for μSOA can be maintained in batch through utilizing a configuration management product. Streamlined deployment and configuration process can simplify operation and maintenance efforts, and also significantly facilitate establishing development and testing environments.

By using direct API calling through API Nexus, μSOA can avoid the dependence on messaging middleware to the maximum extent. We can also improve the parallel computing performance by plugging an inter-thread message queue (which is optimized through zero-copy and lock-free algorithms) thereon. This has greatly increased throughput, reduced delay, and also eliminated huge efforts required for deploying and maintaining a high availability message dispatching cluster. μSOA has minimized the requirement for inter-node cooperation and communication, not imposing high demand for reliability, availability and functionality. In most cases, decentralized P2P protocol such as Gossip is adequate to meet these requirements. Sometimes, inter-node communication can even be completely avoided.

DETAILED DESCRIPTION OF THE PREFERRED EMBODIMENT

Figure 1:
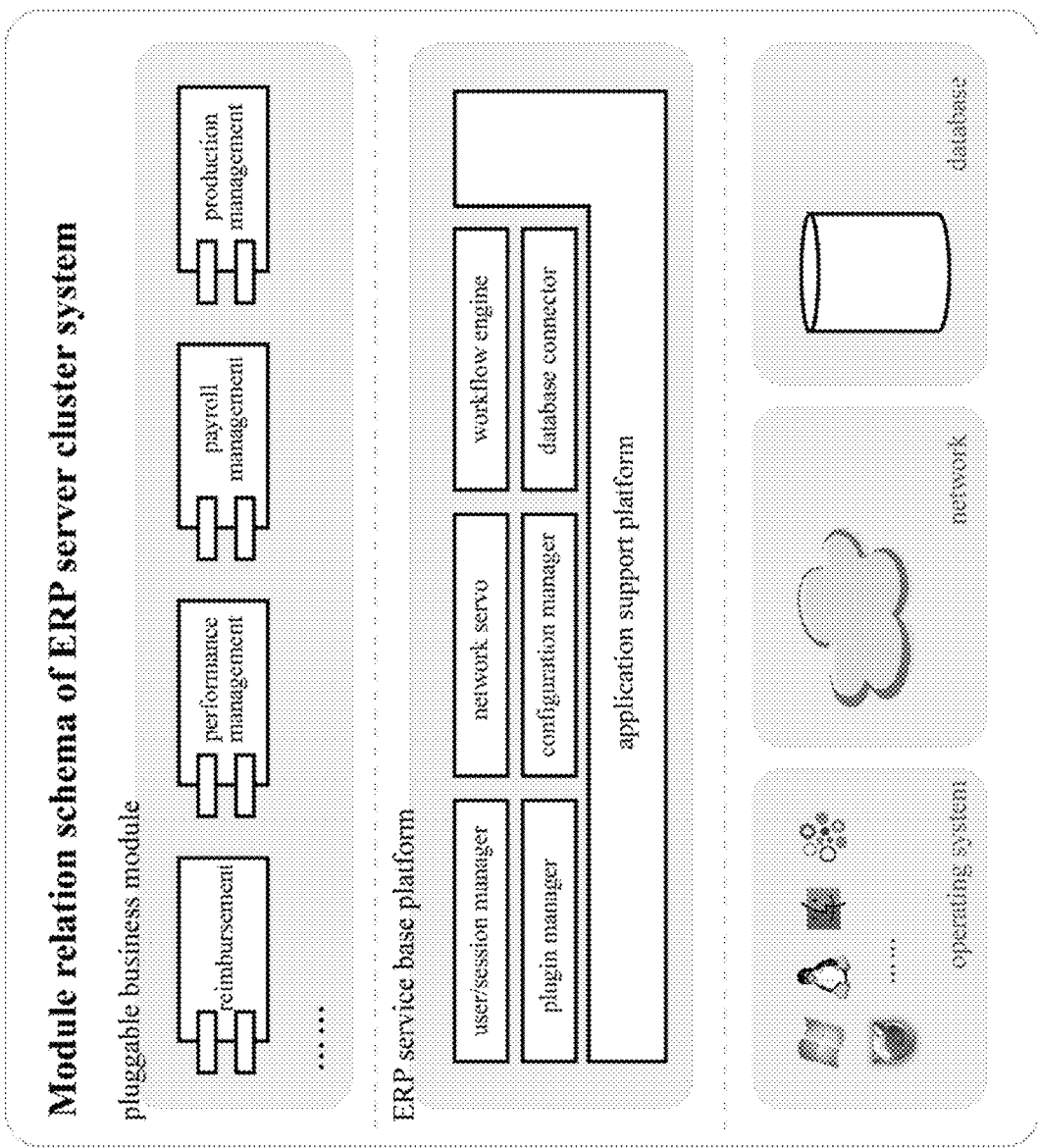
FIG. 1 is the schematic diagram of embodiment I of the present invention.

The embodiments of the present invention are explained in combination with the drawings.

In order to make the purposes, the technical scheme and the advantages of the present invention clearer, the present invention is further explained in details in combination with the functional diagrams and flowcharts. The following illustrative embodiments and descriptions thereof are used to explain the present invention, but are not intended to define the present invention.

The service-oriented modular system architecture comprises plugins and API Nexus, wherein the plugins abstract different functions in servers into pluggable business modules (BMOD, generally, each business module corresponds to one plugin), and any number of API Dispatchers can be registered on the API Nexus, so that one business module in a corresponding plugin dynamically exposes the services, which can be provided at present, to the system and other business modules or other plugins belonging to the system in a manner of API.

It defines cross-platform plugin interfaces (IPlugin). Plugins are usually provided in the form of dynamic-link library (DLL), exposing a single interface like "extern "C" void* CreateInstance(void);". Plugins can also be embedded into projects in the form of static library or source codes, without exposing any interface. Automatic plugins matching is implemented based on current environment factors such as processor, operating system, and release version (MBCS/UNICODE).

Preferably, the dynamic API registering or unregistering mechanism is matched with the hot-plugging and hot-unplugging capability of the plugin interface.

Preferably, the plugins can carry or accept any complex tree structured configuration information. The information is divided into several parts, such as general configurations, advanced configurations, and internal configurations. Each part can be customized according to the category of the plugins or the specific implementations thereof. For example, all plugins belonging to the database connector category can accept same general configuration information including database server addresses, login account and the like; different database connector plugins can separately customize respective advanced configurations, for example the advanced configuration information of the SQLite connector plugins can include whether enabling encryption, encryption algorithms and the like; while the advanced configuration information of the MS SQL Server connector can include connection overtime configurations, ODBC driver name configurations and the like.

Preferably, each plugin can carry two VFS which contains any types of resources. These VFS are used as a resource virtual volume for external services (usually contains resources like pages, graphics, and language pack), as well as a private virtual volume for internal services (e.g., report templates, data fields mapping table etc.).

Preferably, IPlugin defines a complete, self-descriptive, flexible and manageable interface. Based on it, the present invention defines database connector (DBC) plugin types. DBC offers the following functions:

As a middleware, DBC is easier to use than client SDKs for individual database products. It can directly use tree structured configurations that are independent of database products to define table, index and data sharding rules, without the need for any SQL or NoSQL statement.

Support CAS (Compare and Swap) atomic updates that are based on the Revision field. This algorithm can resolve the competition issue that several nodes update the same record simultaneously.

Provide data encryption service transparent to the user, and add reliable strong encryption for data transmission and data storage for underlayer database. In situations where underlayer products or services do not support strong encryption, middleware will be employed for achieving this purpose transparently.

Provide data compression service transparent to the user, and add on-the-fly data compression support for data transmission and data storage for underlayer database. Users can set compression options for each table or each collection separately. Transparent data compression can be enabled simultaneously with other services like data encryption.

Use a generic query object to describe complex query. There is no need for users to create any query statement or to consider the compatibility of underlayer DB products. Complex query expressions independent of database products can be created by using a graphic UI or a query object interface.

Provide the following capabilities by making use of our query engine component intelligently: UNICODE and ARE regular expression matching, advanced query functions like associated query with embedded tables, virtual fields and user customizable query (e.g., users can define BELONGS_TO for department and location). Simultaneously, DBC utilizes capabilities like index provided by underlayer database to improve performance.

High portability—Existing DBC plugins have covered SQLite, MySQL, Microsoft SQL Server, ORACLE, DB2, PostgreSQL, MongoDB, Clutrix and others commonly used database products. Users can easily expand new plugins that are compliant with DBC interface regulations. Because exposed interfaces for configuration, query, update, insert and transactions are all independent of specific products, users can easily switch between database products by simply changing the DBC plugin. This has greatly reduced the dependence on a specific database product.

Preferably, the API nexus comprises a dispatcher registering unit, a dispatcher unregistering unit, an API call request making unit, an API call request posting unit and an API dispatcher matching unit.

The dispatcher registering unit (Register): register the specified API Dispatcher into the current API Nexus. During registering, the kind of the API which can be processed by the dispatcher (called as API category) should be specified. API categories can be matched through prefix, postfix, special description fields or other rules. Within any given time, only one API dispatcher can be specified for each determined API category. API Nexus will forward all API requests of this category to the dispatcher for processing.

The dispatcher unregistering unit (Unregister): unregister the specified API Dispatcher from the current API Nexus. After unregistering, the API dispatcher can be completely separated from the current API Nexus. At this point, the category of the API occupied by the dispatcher can be re-registered and occupied by another API dispatcher.

The API call request making unit (MakeCall): API Nexus automatically forwards the API request to the matched API dispatcher for processing according to the information provided by the request, and returns the processing results. If in the current API Nexus, the API dispatcher matched with the specified request does not exist, an error message is returned.

The API call request posting unit (PostCall): asynchronously execute the request, and if in the current API Nexus, the API dispatcher matched with the request exists, the request is immediately executed; otherwise the request is temporarily stored in a special pending request queue, and after the corresponding API category is successfully registered, the request is immediately executed.

The API dispatcher matching unit (MatchDispatcher): attempt to match the current API Nexus, judge whether the API dispatcher meeting the specified condition exists, and return the result to a caller.

Embodiment I

Example of Distributed ERP Server System Based on μSOA

FIG. 1 simply illuminates a distributed enterprise resource plan (ERP) server cluster system. The system is divided into two parts: a base platform and a pluggable business module.

The base platform downwards encapsulates all underlying functions related to the operating systems, network, database access, and other common services associated with the backend; it is upwards used as running support environment of the business modules, and provides base services of plugin management (IPlugin), API management (API Nexus), user management, configuration management, database management, network servo and other underlayer services for the business modules.

The business modules are pluggable and replaceable on the base platform dynamically. In the view of the platform, each pluggable business module is a plugin running on the ERP service base platform. The business modules are supported by the running environment provided by the "BaiY Application Platform" and the ERP service base platform, consume various services provided by the base platform and obey management and scheduling commands of the base platform. When necessary, multiple business modules can also communicate with each other through the call dispatching mechanism provided by the API Nexus.

In the view of users, actual business functions such as reimbursement, performance management, payroll management, and production management are all implemented by the corresponding business modules. A complete distributed ERP server cluster's App node is formed by combining the ERP service base platform and the business modules.

From this perspective, the base platform seems to be an empty room, while the business modules are various household items placed in the room. In the room, infrastructure constructions of water, electricity, coal, telecommunication and the like are provided and provide support environment during optimized running for special purpose, for settled personnel along with furniture and equipment which are arranged in the room.

Embodiment II

Example of Distributed Network Game Server System Based on μSOA

Figure 2:
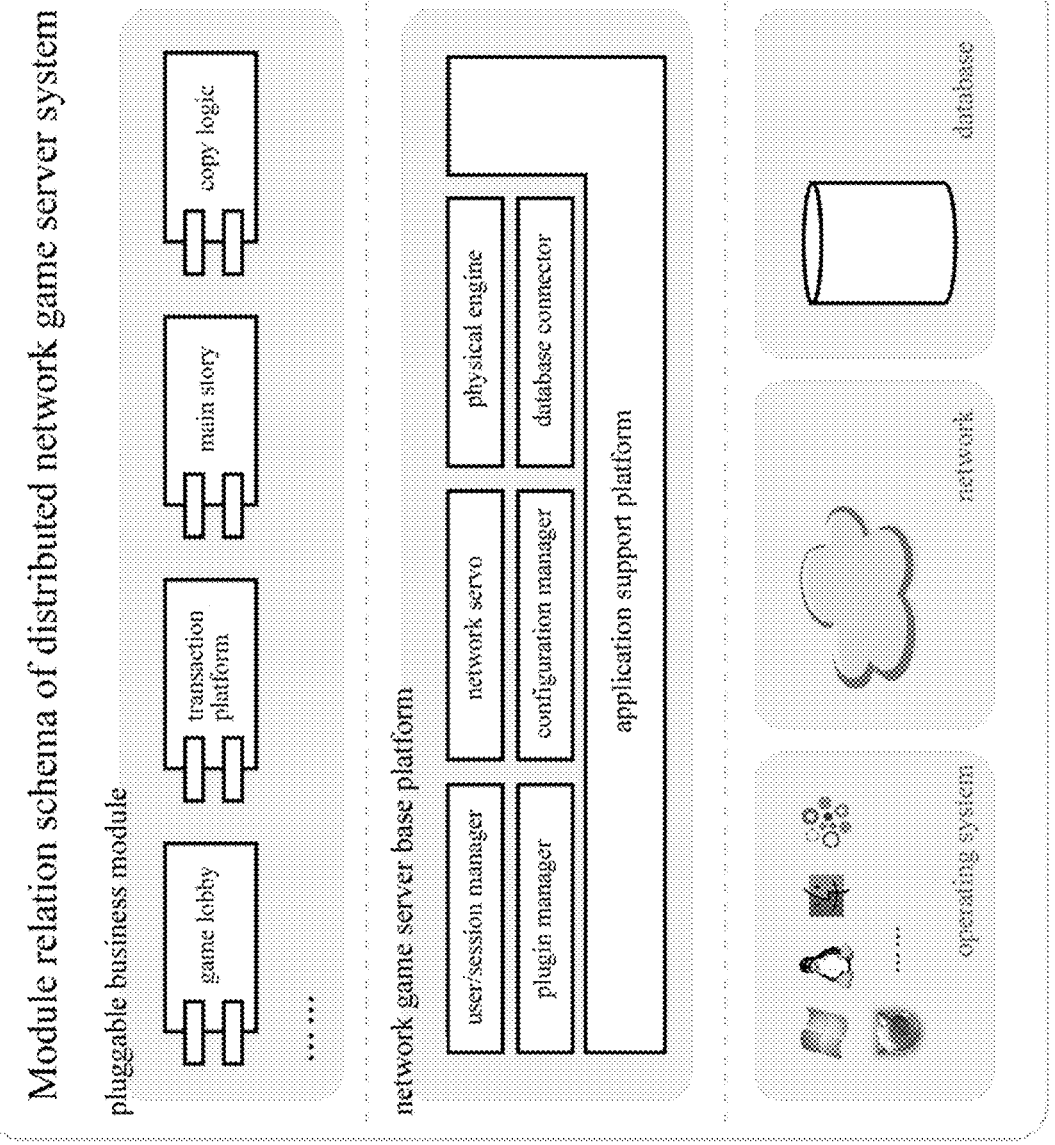
FIG. 2 is the schematic diagram of embodiment II of the present invention.
Figure 3:
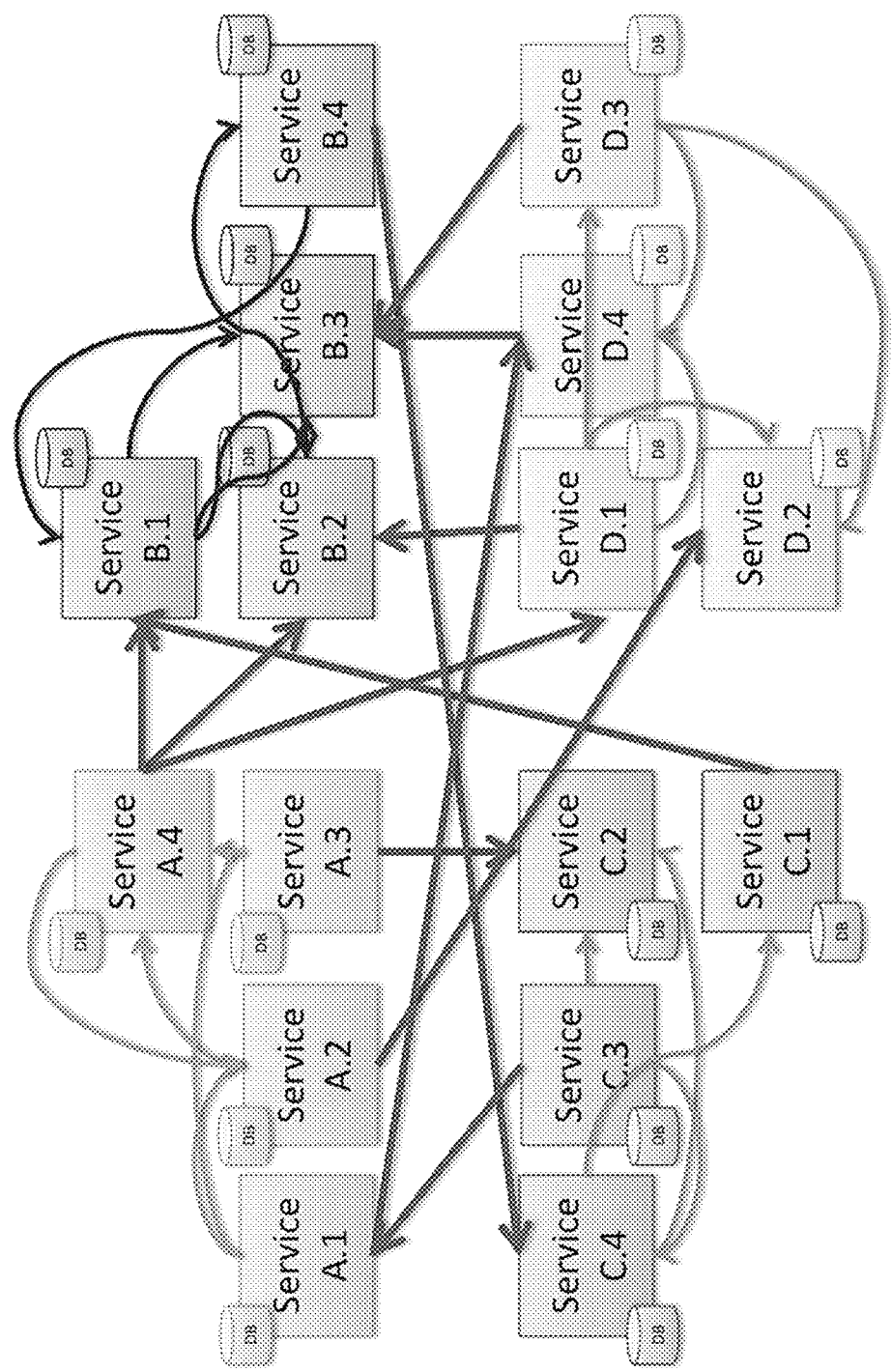
FIG. 3 is a conventionally schematic diagram of the messy dependencies of the SOA.

The structure as shown in FIG. 2 is similar to that in FIG. 1, the system is still divided into two parts of a base platform and a pluggable business module, but special business logic implemented by μSOA is changed into network game from enterprise management. Thus, the μSOA system has good adaptability to various different businesses. The special course of the embodiment II is consistent with that of the embodiment I, not repeated here.

As shown above, the present invention abstracts the different functions in the server application into different pluggable business modules independently, achieves the same isolation effect as "separate and encapsulate different functions into dedicate subservices respectively", and different business modules are allowed to efficiently and dynamically expose their interfaces with each other for use.

What is claimed is:

1. A service-oriented modular system architecture, comprising plugins and an application programming interface (API) Nexus, wherein the plugins abstract different functions in servers into pluggable business modules, and any number of API dispatchers are registered on the API Nexus, so that one business module in a corresponding plugin dynamically exposes services provided at present to other business modules or other plugins belonging to the system in a manner of API, and all the plugins and said API Nexus are running in the same process, wherein, the API Nexus does not need to be defined in advance or known in advance of any interface-related information of the pluggable business modules on the API Nexus.

2. The service-oriented modular system architecture according to claim 1, wherein a dynamic API registering or unregistering mechanism is matched with a hot-plugging and hot-unplugging capability of a plugin interface.

3. The service-oriented modular system architecture according to claim 1, wherein configuration information carried by the plugins is divided into several parts including general configurations, advanced configurations and internal configurations, each part is customized according to the category of the plugins or the specific implementations thereof.

4. The service-oriented modular system architecture according to claim 1, wherein each plugin carries two virtual file systems (VFS) containing any types of resources, which include a resource virtual volume for external services and a private virtual volume for internal services.

5. The service-oriented modular system architecture according to claim 1, wherein the API nexus comprises a dispatcher registering unit, a dispatcher unregistering unit, an API call request making unit, an API call request posting unit and an API dispatcher matching unit.

* * * * *